(12) United States Patent
Carraher et al.

(10) Patent No.: US 8,860,551 B2
(45) Date of Patent: Oct. 14, 2014

(54) AUTOMATED RFID READER DETECTION

(75) Inventors: Theodore Robert Carraher, Raleigh, NC (US); Bruce Henry Hyre, Cary, NC (US); David Kenneth Lavin, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 861 days.

(21) Appl. No.: 12/409,477

(22) Filed: Mar. 23, 2009

(65) Prior Publication Data

US 2010/0237994 A1    Sep. 23, 2010

(51) Int. Cl.
*H04Q 5/22* (2006.01)
*G08B 13/14* (2006.01)
*G01S 13/08* (2006.01)
*H04L 12/24* (2006.01)
*H04W 64/00* (2009.01)

(52) U.S. Cl.
CPC .............. *H04L 41/12* (2013.01); *H04W 64/00* (2013.01)
USPC ..... 340/10.1; 340/10.2; 340/10.5; 340/572.1; 342/118

(58) Field of Classification Search
USPC .............................................. 340/8.1, 539.13
See application file for complete search history.

(56) References Cited

U.S. PATENT DOCUMENTS

| | | | |
|---|---|---|---|
| 5,546,557 A | 8/1996 | Alle et al. | |
| 6,204,813 B1* | 3/2001 | Wadell et al. | 342/463 |
| 6,542,114 B1* | 4/2003 | Eagleson et al. | 342/357.25 |
| 7,035,936 B2* | 4/2006 | Fouquet et al. | 709/238 |
| 7,378,966 B2* | 5/2008 | Agarwal et al. | 340/572.1 |
| 7,557,707 B2* | 7/2009 | Kumar et al. | 340/572.1 |
| 7,619,988 B2* | 11/2009 | Shimada et al. | 370/254 |
| 7,667,572 B2* | 2/2010 | Husak et al. | 340/10.1 |
| 2005/0190098 A1* | 9/2005 | Bridgelall et al. | 342/118 |
| 2005/0206555 A1* | 9/2005 | Bridgelall et al. | 342/127 |
| 2006/0022801 A1* | 2/2006 | Husak et al. | 340/10.5 |
| 2007/0126554 A1* | 6/2007 | Choi et al. | 340/10.1 |
| 2007/0188342 A1* | 8/2007 | Valeriano et al. | 340/825.49 |
| 2007/0188345 A1* | 8/2007 | Yu | 340/854.9 |
| 2008/0284600 A1* | 11/2008 | Drzaic et al. | 340/572.1 |

FOREIGN PATENT DOCUMENTS

| | | |
|---|---|---|
| CN | 1790371 A | 6/2006 |
| CN | 201174774 Y | 12/2008 |
| JP | H0784839 | 3/1995 |
| JP | 2006118998 | 5/2006 |
| KR | WO2008143483 | 11/2008 |

OTHER PUBLICATIONS

Office Action Aug. 31, 2012, Peoples Republic of China State Intellectual Property Office, Application 201010144558.

* cited by examiner

*Primary Examiner* — Daniel Wu
*Assistant Examiner* — Mohamed Barakat
(74) *Attorney, Agent, or Firm* — Grasso PLLC; Fred Grasso (57) ABSTRACT

Included are network devices, systems, methods, and computer readable medium. These may employ a microcontroller with access to computer readable memory and computer readable storage wherein the microcontroller operates at a first network component of a local area network. The microcontroller may be configured to spatially locate one or more fiducial network components of a local area network in which the microcontroller is a member. The spatial location may be determined by receiving a unique identifier for a first fiducial network component, receiving a wireless signal from the first fiducial network component, determining a physical distance between the first network component and the first fiducial network component, and updating a registry with the determined physical distance. In certain embodiments, the network component may be an RFID reader and the unique identifier may be an IP or MAC address.

21 Claims, 4 Drawing Sheets

AUTOMATED RFID READER DETECTION

BACKGROUND

The field of invention regards automated spatial detection of hardware in a network. More specifically, embodiments include devices, methods, and systems that are automated to detect or determine the presence, orientation or spacing of RFID readers.

Radio Frequency IDentification (RFID) is used in various applications in today's commerce. RFID technology involves the use of movable RFID transponders or "tags," movable or stationary RFID readers to detect and record the presence of objects represented via the RFID tags, and a support network to capture and reconcile the data received by the RFID readers.

RFID readers are used to sense the presence of an RFID tag by sensing radio frequencies rebounding or backscattered from the RFID tag. Once sensed, an RFID reader may use the detected radio frequency signal to indicate the presence and identity of a tag. This presence may be used by a network coupled to the RFID reader for recording the presence of the RFID tag at a point in time or to charge an account associated with the RFID tag.

RFID tags comprise an antenna and control logic that work together to uniquely announce the tag. RFID tags may be powered or unpowered. Unpowered tags are referred to as passive RFID tags while tags with their own power source are referred to as active RFID tags. In either instance, an RFID tag acknowledges its presence through electromagnetic waves in the radio frequency band. These waves acknowledge the tag's presence to any RFID reader within range of receiving the tag's radio frequency waves. The tag's radio frequency waves or signal can include modifying and backscattering a radio frequency signal originally received from an RFID reader. An RFID tag may also periodically generate radio frequency signals to announce its presence. Whether a tag is active or passive, its radio frequency signals may be detected by one or more RFID readers.

BRIEF SUMMARY

Embodiments include network devices, systems, methods, and computer readable medium. The network devices may include a microcontroller that operates at a first network component of a local area network. The network device may further include an antenna in communication with the microcontroller where the antenna may be configured to at least transmit or receive radio frequency electro-magnetic waves. In this example the microcontroller may be configured to spatially locate one or more fiducial network components of a local area network in which the microcontroller is a member. The spatial location may be determined by receiving a unique identifier for a first fiducial network component, receiving a wireless signal from the first fiducial network component, determining a physical distance between the first network component and the first fiducial network component, and updating a registry with the determined physical distance and perhaps the orientation. In certain embodiments, the network component may be an RFID reader and the unique identifier may be an IP address, MAC address or other unique designation.

Embodiments may also include a method wherein operating instructions at a microcontroller of a first network component of a local area network are carried out. When these instructions are carried out, the microcontroller may spatially locate one or more fiducial network components in a local area network in which the microcontroller is a member. When carrying out the instructions, the microcontroller may determine the spatial location of one or more fiducial network components by receiving a unique identifier for a first fiducial network component from the one or more fiducial network components, receiving a wireless signal from the first fiducial network component, determining a physical distance between a first network component and the first fiducial network component, and updating a registry with the determined physical distance or orientation, or both.

Embodiments may also include computer readable storage medium having stored thereon instructions, which, when executed by a microprocessor, cause the microprocessor to carryout steps to spatially locate one or more fiducial network components of a local area network in which the microcontroller is a member. These steps may include receiving a unique identifier for a first fiducial network component from one or more fiducial network components, receiving a wireless signal from a first fiducial network component, determining a physical distance between a first network component and the first fiducial network component, and updating a registry with the determined physical distance or orientation or both.

DETAILED DESCRIPTION

Local area networks may comprise servers, databases, sensors, readers, and other components. These components may be added and removed from the network as network demands and requirements change. These components may communicate with other components in the networks through wired and wireless connections and through various means and protocols. When components are added or deleted the local area network may recognize that a component is no longer in the network or may also recognize that a new component has been added to the network. Identifying which components are in the network can be beneficial for managing components within the network, for managing data within the network, and for resolving conflicting input or data from the various components of the network.

In addition to identifying which components are part of the local network, components of the network may also be configured to account for the physical spacing or location of each of the components within the network. Knowing and accounting for the physical spacing of the components may be beneficial for proper performance of the network components and may also be beneficial to detect and reconcile unanticipated movement of components within a network. For example, when multiple RFID readers receive signals from the same RFID tag—a "crossread"—the RFID readers may need to arbitrate whether to assign the signal to a single RFID reader and what factors may be considered when assigning a signal to a specific RFID reader. This arbitration process may include detecting signal strength, determining which RFID readers received the signal, and considering the relative spacing of RFID readers to evaluate which RFID reader is the closest to the signal and the RFID tag.

Figure 1:
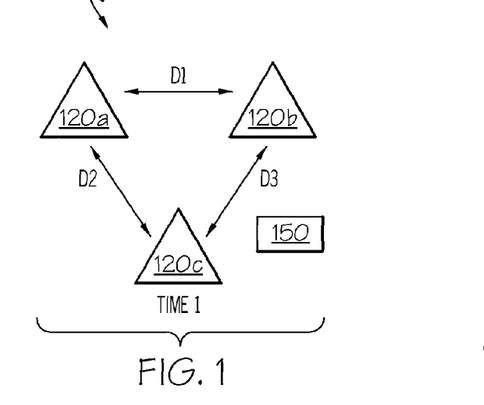
FIG. 1 is a diagram of a local area network with three fiducial network components.

FIG. 1 shows a local area network 100 comprising three fiducial network components 120a-120c and a calibration device, arbiter, or calibration module 150. The fiducial network components (or fiducial components) may be servers that assist remote clients, they may also be RFID readers that are used to monitor a retail facility, loading dock, warehouse facility, or some other location. There may be other types of fiducial components as well. A common attribute of the fiducial components may be that their location in space or their location relative to other fiducial components may need to be known in order for the fiducial component to serve an intended function or purpose. In embodiments, the fiducial components may serve as reference markers that may monitor movement among and between the components.

The local networks in which the fiducial components 120 and arbiter 150 reside may also include other equipment, such as: routers, cabling, remote antennas, personal terminals, and other types of components. All of this equipment may communicate with each other using wired and wireless methods.

Figure 2:
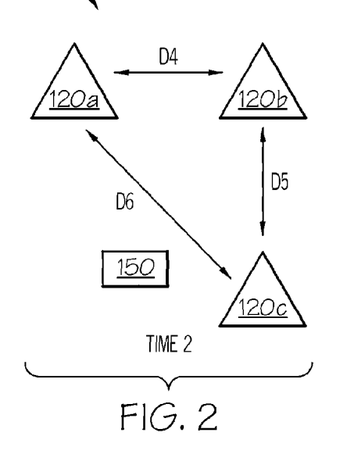
FIG. 2 is a diagram of the local area network of FIG. 1 where one or more of the fiducial network components have been repositioned.

Three fiducial components in a local area network 100 are shown at a time T1 in FIG. 1. At time T1, the distance between these three fiducial components is reflected by D1-D3. FIG. 2, by comparison, shows the same three fiducial components of the local area network 100 of FIG. 1 at a time T2. As can be seen, the three fiducial components 120a-120c remain in the local network, but their location has changed relative to their surroundings and relative to one another. The new distances between the fiducial components, at time T2, are now reflected by D4-D6.

Figure 3:
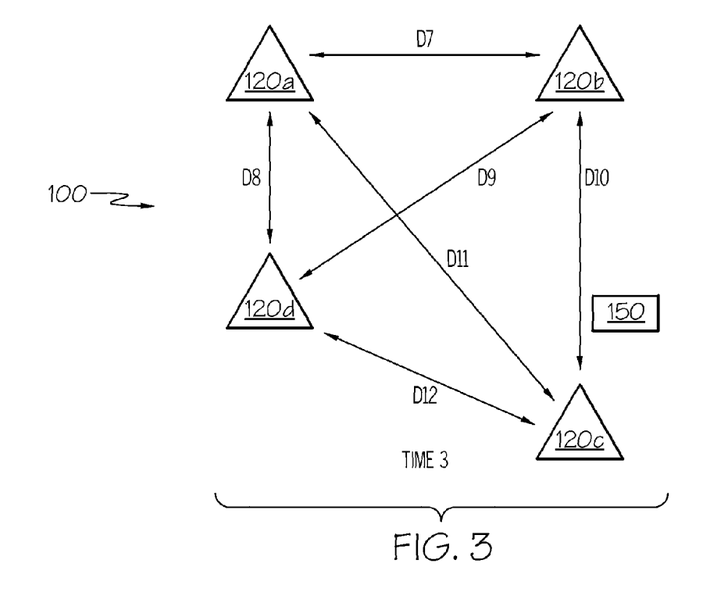
FIG. 3 is a diagram of the local area network of FIG. 1, after one or more fiducial network components have been repositioned within the local network, and after a fourth fiducial network component has been added to the local network.

FIG. 3 shows the local area network 100 of FIG. 1 at time T3. As can be seen, the network 100 now includes four fiducial components 120a-120d. Also, the positions of each of the fiducial components have changed relative to each other. The new distances between the fiducial components 120 are now reflected by D7-D12.

One or more of the fiducial components 120 and the arbiter 150 may be individually configured to recognize the presence of each of the fiducial components 120 in the local area network 100 and to determine the spatial relationship between the fiducial components. For example, when a fiducial component is added, a registry listing all of the fiducial components in the local area network or all of the components in the local area network may be updated to reflect the addition and relative position of the fiducial component. Likewise, when a fiducial component or other device is removed from the local area network, the registry listing of the network may be updated to reflect that change as well.

Embodiments may also include systems, methods, and devices that periodically determine the distances between one or more classes of components in the local area network, i.e. a network calibration cycle. For example, the distance between each of the fiducial components may be helpful information for the functioning or operation of the network. Periodically, the arbiter or calibration device 150, or the fiduciary components 120 themselves, may sense the distance between some or all of the selected components and may then update a registry reflecting the current status of the network. This registry may be stored in each of the fiducial components 120 as well as in the calibration device 150.

A network calibration cycle may occur many times per second or may be spaced to occur a few times per hour or day in order to save overhead in the network. The process of carrying out the calibration cycle may include a combination of wired and wireless communications between the fiducial components, devices associated with the fiducial components, and the calibration device 150. These communications may include self-identifying an IP address, MAC address or other unique identifier, broadcasting this address to some or all components in the network, and using radio frequency telemetry to determine the distances between fiducial components in the network. This distance detection may include generating radio frequency waves and listening for responses from each of the fiducial components in the network. Upon receipt of the responses to the radio frequency broadcasts, distances between each of the fiducial components may be calculated and a registry reflecting these distances may be updated. This registry, which may comprise network components and component distances, may be shared amongst all of the components and may also be stored at a central location and the calibration device 150. As needed, the registry may be accessed to make updates and also when needed to perform functions of the local area network or functions of components within the local area network.

Figure 4:
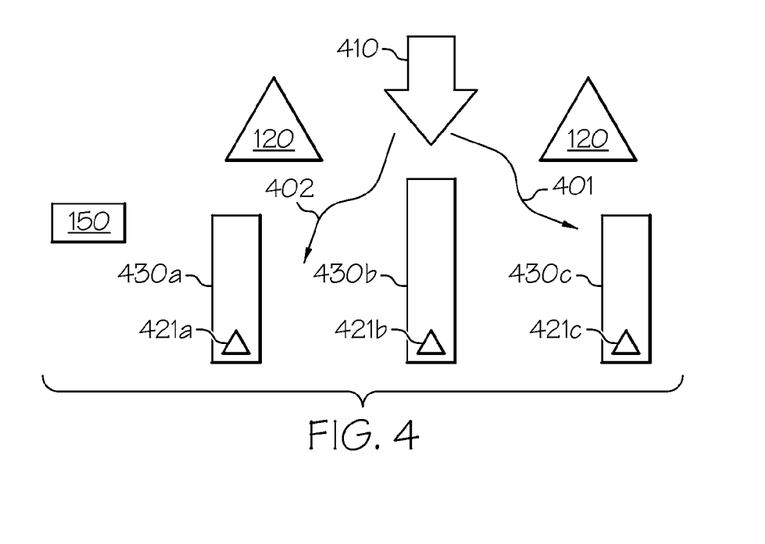
FIG. 4 shows a loading dock and warehouse with a local network of ingress/egress RFID readers and storage RFID readers.

FIG. 4 shows a loading dock and warehouse area with a network of RFID readers that may employ inventive embodiments. Visible in FIG. 4 are ingress/egress RFID readers 120, warehouse RFID readers 421a-421c, warehouse shelving 430a-430c, warehouse entrance 410, arbiter 150, and merchandise paths 401 and 402. In this embodiment, parts merchandise or other material may enter the warehouse through entrance 410 and follow paths 401 or 402 to the shelving 430 in the warehouse. When these materials have been labeled with RFID tags, they can be tracked throughout their lifecycle at the warehouse. When RFID tags are read by multiple RFID readers, an arbitration process may be used to determine which RFID reader is the closest. By determining which RFID reader is the closest, the material may be more accurately located moving within the warehouse and during its storage there as well. The tag arbitration process may employ determining the signal strength of an RFID tag at each RFID reader and, considering the distances between the RFID readers, determining which RFID reader the RFID tag is closest to. Other arbitration techniques may include phase, angle, multipath reflections, read counts, and timing.

Embodiments of the tags may include passive tag circuitry consistent with magnetic induction (near field RFID) and electromagnetic (EM) wave capture (far field RFID). In the magnetic induction circuit a coil coupled to a capacitor may be used to accumulate a charge that may then be used to power the circuitry of the tag and to create a magnetic field that can be read by a nearby reader. In the electromagnetic wave capture circuit a dipole antenna may be used to receive energy as alternating potential from a reader in order to accumulate energy to power its applicable circuitry. The antenna of this EM passive circuitry may be tuned to a frequency that can absorb signals at that frequency and reflect signals when there is a mismatch. These reflected mismatched waves may then be read by an antenna of a reader. Information may be encoded on this mismatched signal through modifications in the impedance over time thereby reflecting back more or less of the signal to the reader.

Figure 5:
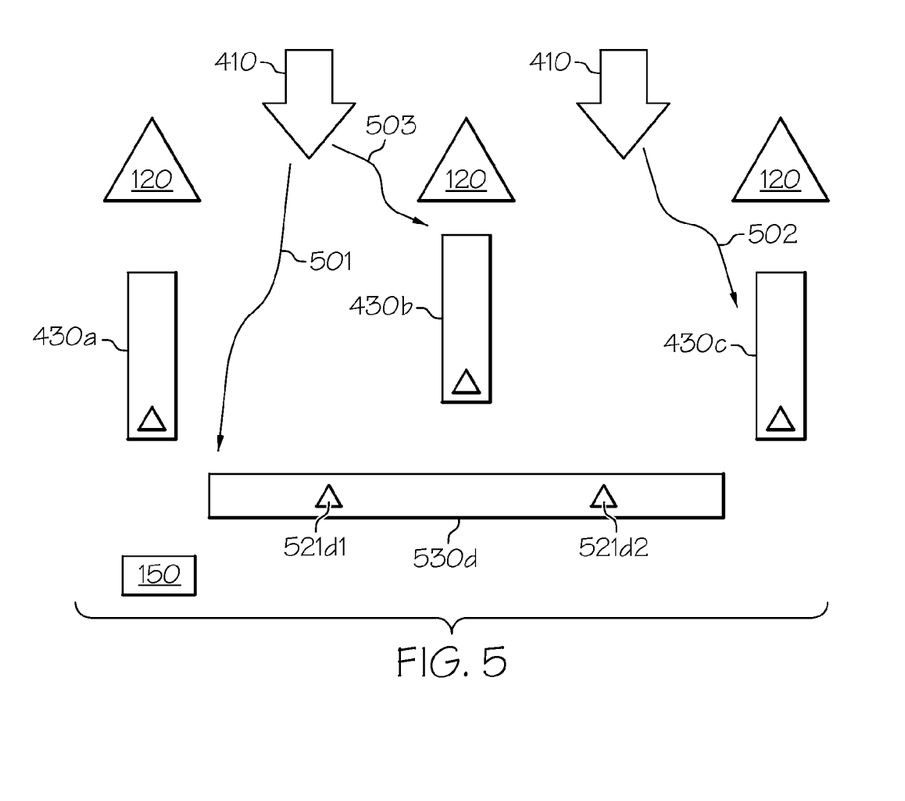
FIG. 5 shows the loading dock and warehouse of FIG. 4 after the addition of an ingress/egress RFID reader and the addition and repositioning of storage RFID readers in the warehouse.

FIG. 5 shows the loading dock and warehouse area of FIG. 4 after the addition of a third ingress/egress RFID reader 120, the addition of a fourth warehouse shelving unit 530*d* and accompanying RFID readers 521*d*1 and 521*d*2, and the repositioning of shelving 430*a*-430*c*. These changes in the loading dock area and warehouse area enable two functional warehouse entrances 410 to be created and many more merchandise paths 501-503 to become available. These changes have also affected the distances between the RFID readers.

In embodiments, the revised distances between the RFID readers may be automatically sensed, determined, and recorded. This calibration cycle may continue in the network many times per second and may also be conducted over longer periods of time, including hourly, daily and even longer. The RFID readers 120 may comprise active or passive RFID tags that may be sensed by other RFID readers in the network. When an RFID reader senses that a new RFID reader has entered into the network or that an RFID reader has moved its position, the RFID reader may send a query to the new or changed RFID reader requesting that the new or changed reader identify its IP or MAC address and to designate which RFID tag or RFID signal identifies the reader. Likewise, the moved RFID reader may auto announce its presence or that it has changed its location. Upon receipt of the response to the query or the announcement from the new/moved RFID reader, the existing RFID reader may generate a radio signal and listen for an RFID signal that coincides with the new/changed RFID reader. Upon receiving the responsive signal, the RFID reader may update the network registry of RFID readers for use by other components within the network.

The arbiter or calibration device 150 may also be used to automatically determine changes with RFID readers in the network. This device may be a stand-alone unit and may also be integrated with one or more of the RFID readers in the network. The calibration cycle may be carried out by the methods, devices and systems supported herein by the calibration device or an RFID reader or a combination of the two.

When an RFID reader is new or its position has changed, the new/changed RFID reader may announce its presence to the network by providing its IP and/or MAC address to other components in the network. Upon receiving this address, the other components may generate a radio signal and listen for a response RFID signal from an RFID tag that coincides with the new/changed RFID reader. Upon receiving the response, the existing RFID readers may update the network registry of RFID readers for use by themselves and other components within the network.

Figure 6:
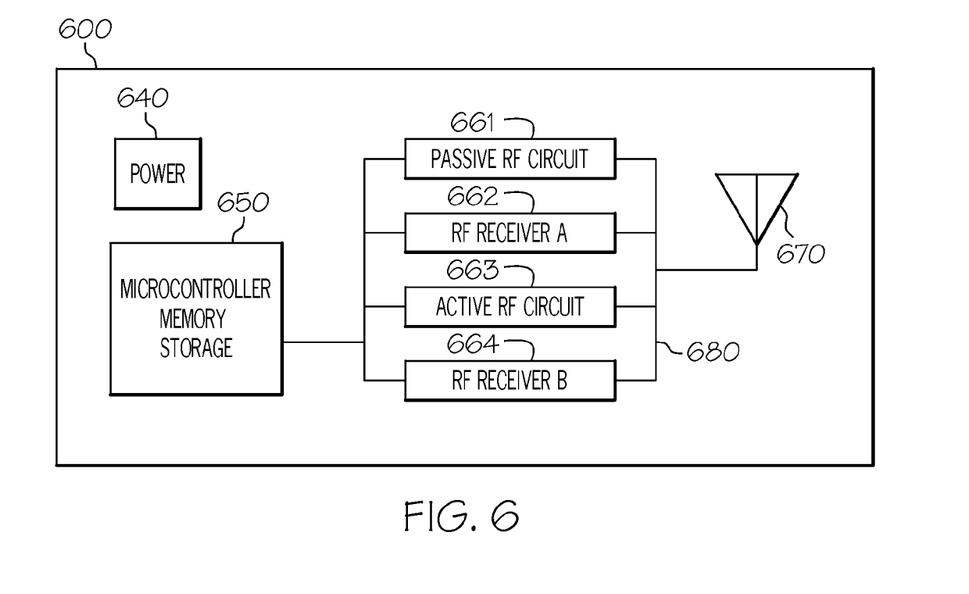
FIG. 6 is a block diagram of an exemplary RFID reader or network calibration module.

FIG. 6 is a block diagram of an RFID reader or calibration module of inventive embodiments. The RFID reader or calibration module 600 may include a power source 640, a microcontroller with memory and storage 650, an antenna 670, radio frequency receiver units 662 and 664, an active radio frequency control circuit 663, and a passive radio frequency control circuit 661. These components may communicate with each other or receive power through the bus 680 or through other circuit connections. Also, in some embodiments, there may be multiple antennas for the RFID reader, where each antenna may be associated with a single control circuit or radio frequency receiver.

Figure 7:
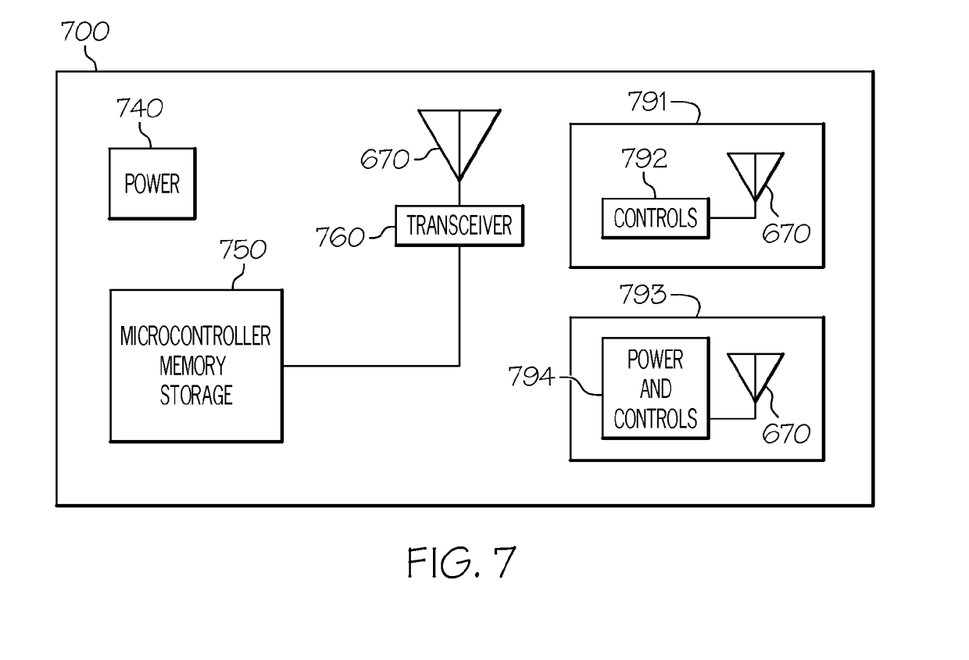
FIG. 7 is a block diagram of an exemplary RFID reader.

FIG. 7 is a block diagram of an RFID reader of inventive embodiments. The RFID reader 700 may include a power source 740, a microcontroller with memory and storage 750, an antenna 670, a transceiver 760, and two RFID tags—an active tag 793 and a passive tag 791. The passive tag may include controls 792 and an antenna 670 while the active tag 793 may include an antenna 670 as well as power and controls 794. The storage 750 of the reader 700 may include in memory, unique identifications of the passive RFID tag 791 and the active RFID tag 793. These unique identifications may include the MAC address of the reader in a User Data field.

The unique identifiers used to identify the readers of FIGS. 6 and 7 may be associated with single readers as well as to groups of readers. For example, several readers may identify themselves as belonging to a single entrance or portal and may not self-identify beyond the group. In so doing, specific portals or entrances may be more simply accounted for by the network as a whole. Also, other radio protocols may be used during self-discovery. For example, Bluetooth protocols may be used along with signal strength. Still further, UDP communication methods or other methods may be used within the network to communicate between readers or other components. Thus, both wireless and wired communications may be employed.

Figure 8:
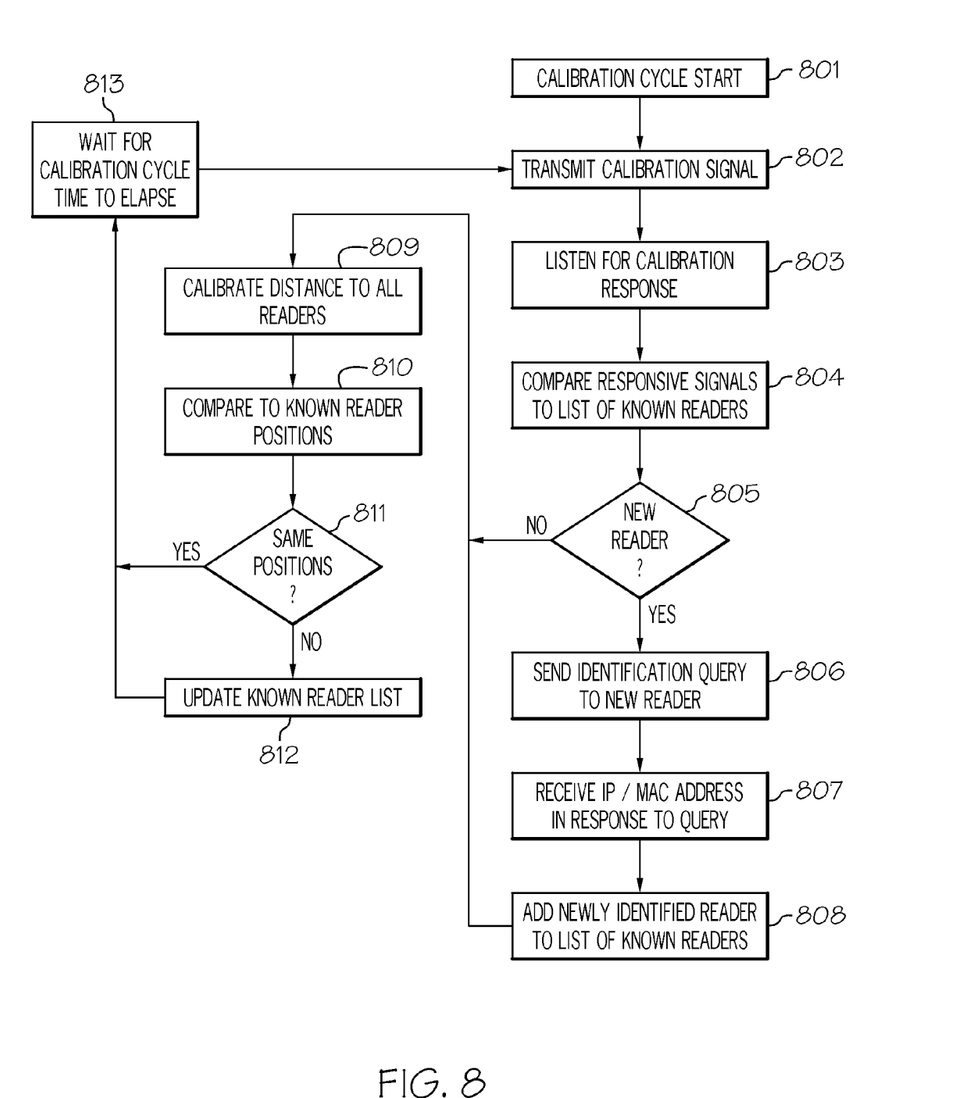
FIG. 8 is a functional block diagram of acquisition and control logic of an exemplary RFID reader or network calibration module.

FIG. 8 is a functional block diagram of acquisition and control logic of an exemplary RFID reader or network calibration module. The calibration cycle described herein may be carried out using these or other steps and may be carried out in the provided sequence as well as in other sequences. Moreover, some of the steps may be omitted, combined, and modified while remaining within the spirit and scope of this disclosure and the invention.

The calibration cycle of FIG. 8 may start at power-up for an RFID reader or calibration module. The cycle may also start upon sensing the presence of a new RFID reader in the local area network. When the cycle has begun, the RFID reader may transmit a calibration RF signal as shown in 802 and listen for a response as shown in 803. Upon receiving responses from the calibration RF signal, the RFID reader may compare the received responses to a registry of known readers and may determine if the response comes from a new RFID reader. These actions are shown in 804 and 805. If a new RFID is identified, the RFID reader or calibration module may send a query to the new RFID reader to identify itself, as shown in 806. The new RFID reader may respond with its IP or MAC address and this response may be received by the RFID reader or calibration module carrying out the calibration, as shown in 807. The signal strength of this response may be measured and compared with the signal strength of other RFID readers in the network in order to determine the relative distance to the new RFID reader.

As shown in 808, this new information may also be used to update a registry of network components where the registry is retained at the RFID reader or at various components in the local area network. An RFID reader may complete a reverse MAC-IP lookup in order to obtain the registry of neighboring RFID readers.

At 809, the RFID reader may send a radio signal to calibrate its position with each of the other RFID readers in the network. This signal may include a personal identification of the RFID reader, e.g. "I am reader R, and I see readers X, Y, and Z in this proximity." Upon receiving the responses back from the other RFID readers, the calibrating RFID reader or the calibration module may determine the distance to all of the readers and may compare these distances to known RFID reader positions. When distances between readers is known, this information may be used by the readers when deciding which reader an RFID tag is closest to when the tag is read by multiple readers.

In some instances, more than one RFID reader may be conducting a calibration cycle. In this case, the RFID readers conducting the calibration or the calibration module may exchange distances to other RFID readers that have been calculated in order to verify the accuracy of the calibration.

At 811, if none of the positions of the RFID readers have changed, then a period of time may lapse before beginning the next calibration cycle. If RFID reader positions have changed, then the registry of known RFID readers may be updated, as shown at 812. Thus, the steps may be used to identify the presence, absence, additional or removal of an RFID reader.

The tags and readers may use various frequencies including low frequencies (30-500 kHz), high frequencies (10-15 Mhz) and ultra high frequencies (850-950 MHz, 2.4-2.5 GHz, AND 5.8 GHz). The frequency chosen for operation may depend on the intended us of the RFID system where high frequencies may be more useful for short read times while lower frequencies may be more useful in environments with high metals and fluid environments and when larger spiral inductors may be used in the tags.

Standards that may be employed, at least in part, include ISO11784-85, ISO 14223, ISO 10536, ISO 14443, ISO 15693, and ISO 1800.

Other embodiments are also encompassed. For example, an additional confidence algorithm may be used to assess the accuracy of the distances calculated for each of the readers. Also, in addition to radio frequency identification, global positioning algorithms or techniques may be used to locate the fiducial network components, including the RFID readers discussed throughout. Still further, should a fiducial network component not be detected, but is known to be present in the network, the other fiducial components or the arbitration module may extrapolate the fiducial component's position from previous known positions in order to "self-heal" the network and reduce the likelihood of tag misreads. Also, multiple antennas may be placed on single sides of a polygonal RFID reader. Depending upon which antenna's signals are received from the other RFID readers in the network, the relative orientation of the RFID readers relative to one another can be deduced.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiments were chosen and described in order to best explain the principles of the invention and the practical application, and to enable others of ordinary skill in the art to understand the invention for embodiments with various modifications as are suited to the particular use contemplated.

What is claimed is:

1. A network component comprising:
   a microcontroller having access to computer readable memory and computer readable storage, the microcontroller operating at a first nonfiducial network component of a local area network; and,
   an antenna in communication with the microcontroller, the antenna configured to at least transmit or receive radio frequency electro-magnetic waves,
      wherein the microcontroller is configured to spatially locate one or more fiducial network components in the local area network in which the microcontroller is a member,
      wherein the microcontroller is further configured to determine the spatial location of one or more fiducial network components by:
         receiving a unique identifier for a first fiducial network component from the one or more fiducial network components,
         receiving a wireless signal from the first fiducial network component,
         using a plurality of received wireless signal responses to a previously sent wireless signal, the received responses from two or more fiducial network components in the local area network, to determine, using radio frequency telemetry, the physical distance between each fiducial network component for which a response was received, and
      wherein the microcontroller is further configured to exchange with other components of the local area network, distances between fiducial network components calculated by other components of the local area network, and verify the accuracy of these calculated distances between fiducial network components.

2. The network component of claim 1 wherein the first fiducial network component is an RFID reader added to the local area network after initially determining the physical distance between each fiducial network component for which a response was received.

3. The network component of claim 2 wherein the unique identifier is an IP address or MAC address.

4. The network component of claim 2 wherein the microcontroller is further configured to query known RFID readers in a network and, in response to this query, determine a physical distance between the network component and one or more newly added RFID readers.

5. The network component of claim 1 wherein the unique identifier is received from an active RFID tag positioned on a fiducial network component.

6. The network component of claim 1 wherein the unique identifier is received from a passive RFID tag positioned on a fiducial network component.

7. A method of initially locating or subsequently calibrating fiducial network components, the method comprising:
   carrying out operating instructions at a microcontroller of a nonfiducial first network component of a local area network, the microcontroller having access to computer readable memory and computer readable storage and in communication with an antenna configured to at least transmit or receive radio frequency electro-magnetic waves,
      wherein, when carrying out the instructions, the microcontroller spatially locates one or more stationary fiducial network components in the local area network in which the microcontroller is a member,
      wherein, when carrying out the instructions, the microcontroller determines the spatial location of one or more fiducial network components by:
         sending a radio signal to two or more fiducial network components, the radio signal including the identity of the nonfiducial network component;
         using radio frequency telemetry from received radio signal responses to the sent radio signal, from fiducial network components, to determine a physical distance between the first nonfiducial network component and any fiducial network component to send a radio signal response to the sent radio signal, and
         updating a registry with the determined physical distance or distances, and
      when carrying out the instructions, the microcontroller exchanges, with other components of the local area network, distances between fiducial network components calculated by the other components of the local area network, and verifies the accuracy of these calculated distances between fiducial network components.

8. The method of claim 7 wherein the first fiducial network component is an RFID reader and wherein the first fiducial network component determines a distance between it and two or more other RFID readers.

9. The method of claim 8 wherein the unique identifier is an IP or MAC address.

10. The method of claim 8 wherein the microcontroller further queries known RFID readers in the local area network and, in response to this query, determines a physical distance or relative direction between the microcontroller and one or more known RFID readers.

11. The method of claim 7 wherein the unique identifier is received from an active RFID tag positioned on a fiducial network component.

12. The method of claim 7 wherein the unique identifier is received from a passive RFID tag positioned on a fiducial network component.

13. A non-transitory computer readable medium having stored thereon instructions, which when executed by a microprocessor cause the microprocessor to carryout steps comprising:
spatially locating one or more fiducial network components of a local area network in which the microcontroller is a member by:
receiving a unique identifier for a first fiducial network component from one or more fiducial network components,
receiving a wireless signal from the first fiducial network component, using radio frequency telemetry from a plurality of received wireless signal responses to a previously sent wireless signal, the received wireless responses from two or more fiducial network components in the local area network, to determine the physical distance between each fiducial network component for which a response was received;
updating a registry with the determined physical distance or distances;
exchanging, with other components of the local area network, distances between RFID readers calculated by the other components of the local area network; and
verifying the accuracy of the calculated distances between RFID readers.

14. The non-transitory computer readable medium of claim 13 wherein the wireless signal is a radio signal, such as an RFID signal.

15. The non-transitory computer readable medium of claim 13 wherein the registry includes information identifying components of the local area network and wherein the registry is accessible by the components of the local area network.

16. The non-transitory computer readable medium of claim 13 wherein determining the physical distance includes determining the location of each fiducial network component for which a response was received.

17. The non-transitory computer readable medium of claim 13 wherein spatially locating one or more fiducial network components of a local area network in which the microcontroller is a member further comprises:
determining the orientation of one or more stationary fiducial network components.

18. The non-transitory computer readable medium of claim 13 wherein the first fiducial network component is a stationary RFID reader.

19. The non-transitory computer readable medium of claim 13 wherein spatially locating one or more fiducial network components of a local area network in which the microcontroller is a member further comprises:
listening for an announcement from a fiducial network component, the announcement indicating that the fiducial network component has joined the local network or has moved to a different location.

20. The non-transitory computer readable medium of claim 13 wherein spatially locating one or more fiducial network components of a local area network in which the microcontroller is a member further comprises:
repeating a calibration cycle in which the presence of one or more RFID readers in the local network is sensed and compared to a list of known RFID readers, the calibration cycle comprising:
sending an identification query to a newly identified RFID reader;
comparing a calibrated distance to readers on the list of known RFID readers and comparing to known RFID reader positions; and
receiving a calibration RF signal from one or more RFID readers in the local network.

21. The non-transitory computer readable medium of claim 13 wherein spatially locating one or more fiducial network components of a local area network in which the microcontroller is a member further comprises:
when a fiducial network is not detected but is known to be in the local area network, extrapolating the location of the nondetected fiducial network component by reusing one or more previously known positions of the nondetected fiducial network component.

* * * * *